S. D. FIELD.
Dynamo-Electric Machine.

No. 223,845.  Patented Jan. 27, 1880.

Witnesses:
W. Floyd Quckett
D. B. Lawler

Inventor:
Stephen D. Field
per John L. Boone
Attorney.

N. PETERS, PHOTO-LITHOGRAPHER, WASHINGTON, D. C.

UNITED STATES PATENT OFFICE.

STEPHEN D. FIELD, OF SAN FRANCISCO, CALIFORNIA.

DYNAMO-ELECTRIC MACHINES.

SPECIFICATION forming part of Letters Patent No. 223,845, dated January 27, 1880.

Application filed June 28, 1879.

*To all whom it may concern:*

Be it known that I, STEPHEN D. FIELD, of the city and county of San Francisco, in the State of California, have invented an improved method of utilizing the currents generated by dynamo-electric or magneto-electric machines for the purpose of telegraphy; and I do hereby declare that the following is a full, clear, and exact description thereof, reference being had to the accompanying drawings, in which—

Figure 1:
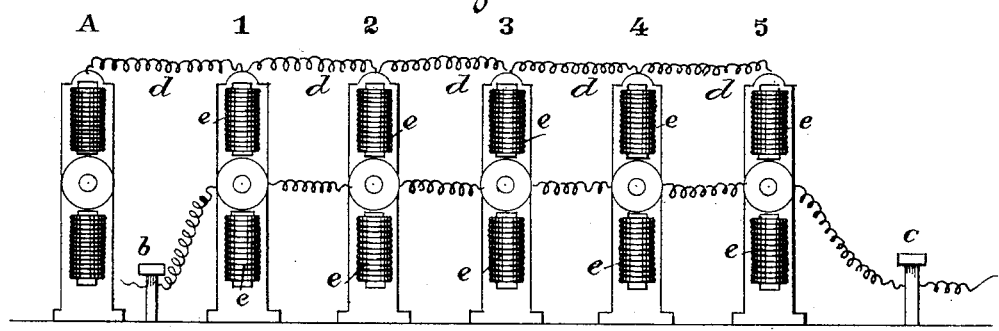
Figure 2:
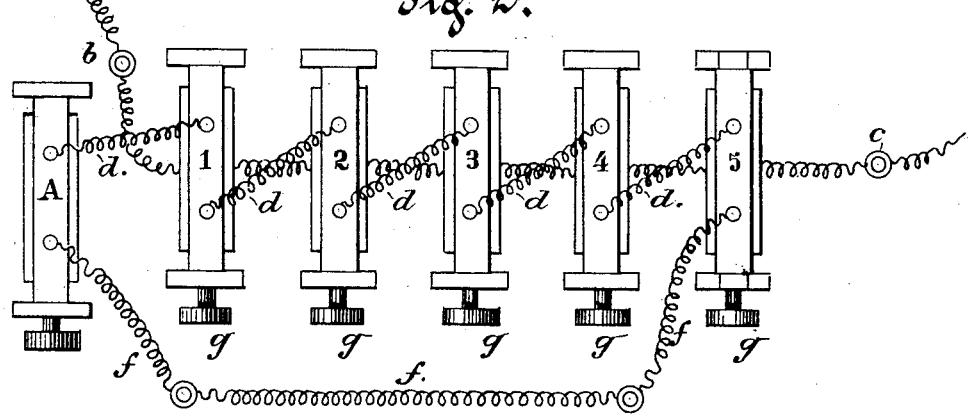

Figure 1 is an elevation, and Fig. 2 a plan view.

The chief obstacle heretofore met in using dynamo or magneto electric machines for telegraphic purposes has been that a sensible variation in the current generated by said machines is occasioned by slight irregularities in the speed at which they are driven.

I propose to overcome this obstacle, if not entirely, to at least lessen it so as to render it inappreciable, in substantially the following manner.

If, instead of one single generator, several be used to develop a current, the variation of intensity produced by irregularity of speed in any one of them is only a fractional part of what it would have been if the current had been generated by a single machine, and the fraction becomes smaller as the number of generators is increased.

The object of my invention is, therefore, to combine several dynamo-electric or magneto-electric machines to produce a single current, so as to divide, lessen, balance, or equalize any increase or decrease of intensity occasioned by irregularity of speed or other causes.

Referring to the accompanying drawings, which represent a combination of dynamo-electric machines for the purpose above mentioned, let 1, 2, 3, 4, and 5 represent dynamo-electric machines, the armatures of which are connected by suitable wires and brushes.

A is an auxiliary dynamo-electric machine, the current from which passes over the wires *d d d*, through the electro-magnets *e e e*, and thence, by the wire *f*, back to the auxiliary machine A. The current from this auxiliary machine polarizes the exciting-magnets *e* of the generators 1, 2, 3, 4, and 5, from which the line-currents are taken.

When magneto-electric machines are used this auxiliary force is not needed, the permanent magnetism of the magnets taking its place.

The operation of my device is as follows: A uniform motion being imparted to the pulleys *g g g*, dynamo-electric currents will be generated, varying directly as the speed of rotation. Should, however, the belt attached to any of the generators 1, 2, 3, 4, or 5 slip, the current of that particular machine would be reduced; but as the remainder of the machines would still run at full speed, the ultimate weakening of the main current would, in the present instance, only be one-fifth of what it would have been if the generator whose belt slipped had been alone employed to generate the main current.

I do not limit myself to any particular number of generators employed to produce the main current, but propose to use as many as experience will indicate.

*b* and *c* are the binding-posts, from which wires are led to the telegraphic apparatus to be actuated and to the ground-connection, respectively.

Having thus described my invention, what I claim, and desire to secure by Letters Patent, is—

In a dynamo-electric machine, the combination, with a series of dynamo-electric generators having a line or other wire, of the auxiliary dynamo-electric machine, connected to the adjoining generator by a wire, *d*, and each generator to the succeeding one by a similar wire, *d*, with a circuit returning-wire, *f*, between the auxiliary and the other generators, substantially as and for the purpose set forth.

In witness whereof I have hereunto set my hand and seal.

STEPHEN D. FIELD. [L. S.]

Witnesses:
W. F. CLARK,
W. FLOYD DUCKETT.